United States Patent [19]

Tsuji

[11] Patent Number: 4,839,631

[45] Date of Patent: Jun. 13, 1989

[54] MONITOR CONTROL APPARATUS

[75] Inventor: Shintaro Tsuji, Inazawa, Japan

[73] Assignee: Mitsubishi Denki Kabushiki Kaisha, Japan

[21] Appl. No.: 208,837

[22] Filed: Jun. 17, 1988

Related U.S. Application Data

[63] Continuation of Ser. No. 862,793, May 13, 1986, abandoned.

[30] Foreign Application Priority Data

May 14, 1985 [JP] Japan ................................ 60-102088

[51] Int. Cl.⁴ ......................... G08B 13/00; H04N 7/18

[52] U.S. Cl. .................................... 340/541; 187/105; 385/105

[58] Field of Search .................... 340/541, 529, 825.06, 340/825.17; 187/105, 132, 140; 358/105, 108; 364/550

[56] References Cited

U.S. PATENT DOCUMENTS

| | | | |
|---|---|---|---|
| 4,160,998 | 7/1979 | Kamin | 358/105 |
| 4,249,207 | 2/1981 | Harman et al. | 358/108 |
| 4,257,063 | 3/1981 | Loughry et al. | 358/108 |
| 4,520,343 | 5/1985 | Koh et al. | 187/105 |
| 4,662,479 | 5/1987 | Tsuji et al. | 187/131 |

FOREIGN PATENT DOCUMENTS

| | | |
|---|---|---|
| 49-29743 | 3/1974 | Japan . |
| 59-128178 | 7/1984 | Japan . |

*Primary Examiner*—Glen R. Swann, III
*Assistant Examiner*—Mullen, Jr. Thomas J.
*Attorney, Agent, or Firm*—Leydig, Voit & Mayer

[57] ABSTRACT

A monitor control apparatus for preventing crimes commited within or in the vicinity of a building in which movements of individuals are detected to determine the behavior thereof. Upon detection of suspicious behavior, predetermined functions are executed to alert appropriate authorities, and alarms are issued. Various time intervals, such as waiting periods during which a individual remains within a designated are and the periods during which the individual moves with a certain speed are determined on the basis of tracking movements so that actions considered to be of a suspicious nature are detected and appropriate responses are executed in a timely manner.

15 Claims, 8 Drawing Sheets

MONITOR CONTROL APPARATUS

This application is a continuation of application Ser. No. 862,793 filed May 13, 1986, now abandoned.

BACKGROUND OF THE INVENTION

This invention relates to a monitor control apparatus for crime prevention and, more particularly, to a monitor control apparatus capable of detecting movements within designated areas of visitors to a building to determine the behavior thereof so as to execute predetermiend functions when the behavior of a visitor is of a suspicious nature;

Recently, crimes committed within and/or in the vicinity of buildings have increased drastically to pose a social problem. For example, criminals may attack passengers (especially, women) in an elevator cage in the vicinity of an elevator hall, a landing, a passageway or namely, places near a building which are not conspicuous at night. On the other hand, other crimes, such as robberies, are often committed in public areas, such as department stores, shops or office buildings where individuals other than working employees can freely come and go.

As measures for preventing such crimes from being committed inside and outside a building and especially in the vicinity of an elevator certain procedures, such as disclosed in "Elevator Crime Preventive Measure Standards for Apartment Buildings", an article prepared by the Japan Elevator Association, has been contemplated. According to this document, a hall door with glass windows is provided in addition to a cage door. The cage is stopped at each floor to allow easy inspection of the interior of the cage from outside. An alarm pushbutton switch is disposed on the cage call panel so as to permit a passenger in trouble to inform others outside the cage of any abnormality or lifethreatening circumstances occurring to him (or her) inside the cage. Further, there has recently been proposed a system (Japanese Patent Application Laid-open No. 59-128178) wherein a television camera is mounted in a cage to visually monitor the interior of the cage by transmitting the images thereof to responsible personnel. In another crime prevention apparatus, devices for detecting any abnormality in a cage, such as a large vibration, (Japanese Patent Application Laid-open No. 59-100078) or change of light reflected from an edged tool carried by a criminal (Japanese Patent Application Laid-open No. 58-109373) are provided to alert responsible personnel that a criminal act is in process. Under these circumstances the cage is stopped at the nearest floor, its door opened, and an alarm issued.

For residential buildings an "interphone autolock system" is often utilized. Under this system, a visitor notifies the host in a desired dwelling by the use of a group interphone installed outside the building. To acknowledge the visit, the host depresses an entrance opening button in his/her room to unlock the main entrance door of the building. This system often works quite effectively in crime prevention since only authorized visitors are allowed access to the building after direct contact with the acknowledgement from the host. There has also been put into practical use a crime prevention apparatus wherein an infrared sensor, an ultrasonic sensor, a motor-operated sensor, or the like is disposed in places, such as doors or windows, so that, when an invader or an unauthorized entry is detected, a warning is issued or an alarm is activated to inform appropriate personnel.

However, above-described crime prevention monitoring systems include various shortcomings. For the system which monitors the interior of the elevator cage, continuous monitoring by appropriate authorities must be provided around the clock and personnel must be continually on guard to make the system effective. This approach is often quite expensive and therefore impractical. Also it is often late at night when no one monitors the cage, or when the caretaker is off guard that crimes are committed. As for the systems which include an alarm pushbutton switch or detect abnormal vibrations and changes in reflected light in the cage, the victim often is deprived of freedom of movement or is exposed to fear, and hence, he/she is often unable to depress the alarm pushbutton switch or to make noise and vibrations. Also, during the entire course of the crime the weapons or tools which reflect light may not be exposed to make the system effective. Furthermore, since the detection occurs after the criminal act has already been committed, the victim is already terrified and may experience shock or lasting psychological effect.

With the "interphone autolock system" which prevents a suspicious person from entering the building, it is often the case that the would-be criminal will wait for the arrival of an inhabitant or an acknowledged visitor to enter the building upon the unlocking of the entrance door.

As for the system using sensors, it is often too late when action is taken after the operation of the sensor, and a system which detects a suspicious person at an early stage has been desired. In this respect, it is also desirable to expand the detection range of the crime preventive sensor so as to cover a place for common use. Since, however, the place for common use is also utilized by general people bearing no criminal intention, generating As described above, the crime preventive monitor systems of the prior art have had the problem that they cannot early detect a person acting strangely from among people acting in an ordinary way and cannot provide a warning or an alarm promptly.

SUMMARY OF THE INVENTION

This invention has as an object to solve the problems as described above, and has for its more specific object to provide a monitor control apparatus which monitors the actions of individual persons inside and outside a building, automatically detects a person of strange behavior from among them at an early stage, and issues a warning as well as an alarm, whereby crimes can be prevented from occurring.

The monitor control apparatus according to this invention is so constructed that the actions of individual persons in predetermined regions such as a hall, passageway and road which are places for common use inside and outside a building and considered to be liable to crimes are tracked by measurement means, that the features of the manners of movements of the persons in these regions are determined by analysis means, and that crime preventive control devices are actuated when a set condition is detected by decision means.

BRIEF DESCRIPTION OF THE DRAWINGS

In the drawings, the same symbols indicate identical or corresponding portions.

DESCRIPTION OF THE PREFERRED EMBODIMENTS

Now, an embodiment of this invention will be described with reference to the drawings.

Figure 1:
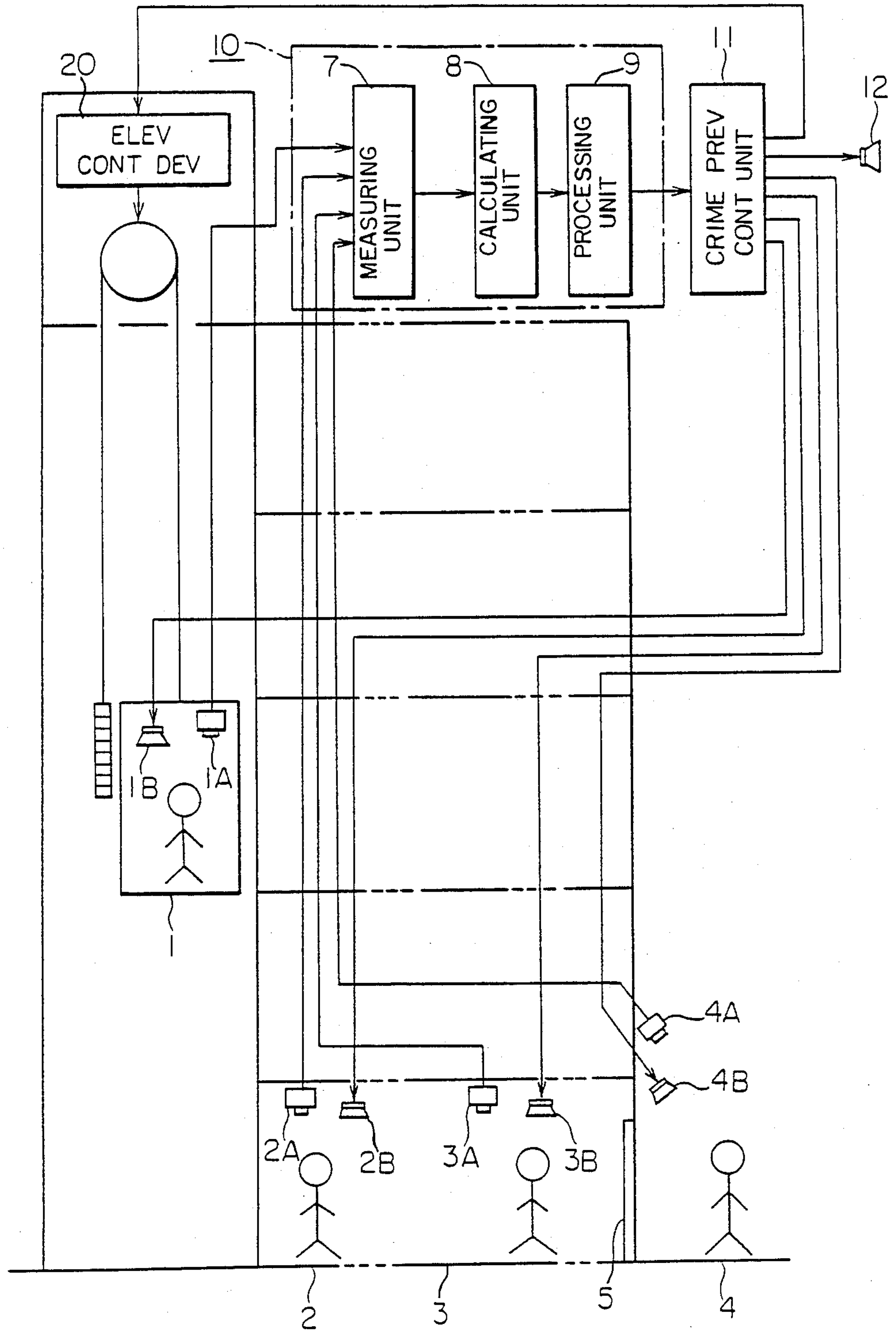
FIG. 1 is a general arrangement diagram of a monitor control apparatus according to this invention.

FIG. 1 is a diagram of the whole construction of a monitor control system. In the figure, numeral 1 designates a cage of an elevator system in a fivestory building, numeral 2 a elevator hall of the first floor, numeral 3 a part of a passageway leading to the elevator hall 2, and numeral 4 an outside area adjoining an entrance 5 of the building. Shown at numeral 10 is a monitor control apparatus including a measurement means, herein shown as a measuring unit, 7 connected with television cameras 1A–4A to monitor the activity in the cage 1, the elevator hall 2, the passageway 3, and the outside area by analyzing received images so as to track movements of objects moving within predetermined regions of the respective places 1–4 The monitor control apparatus 10 further comprises analysis means 8, shown as a calculating unit, for measuring the resident periods of time for which the respective objects remain within the predetermined regions in accordance with the tracking states of the measuring unit 7; and decision means 9, shown as a processing unit, for actuating crime prevention control unit 11 upon detecting that the resident periods of time have exceeded prescribed time intervals.

In carrying out the invention, the crime prevention control means 11 issues a warning or announces information to people in the cage 1, elevator hall 2, passageway 3, and outside area 4 through loudspeakers 1B–4B, and issues an alarm to a caretaker through a loudspeaker 12 disposed in a caretaker's room. Further, the crime prevention control unit 11 provides a command for causing the cage 1 to wait with its door open at a specified floor or a command for inhibiting the stoppage of the cage at a specified floor to an elevator control device 20 which controls the starting, running, and stoppage of the cage 1, the door opening and closing operations thereof, the registration of calls, etc.

Figure 2:
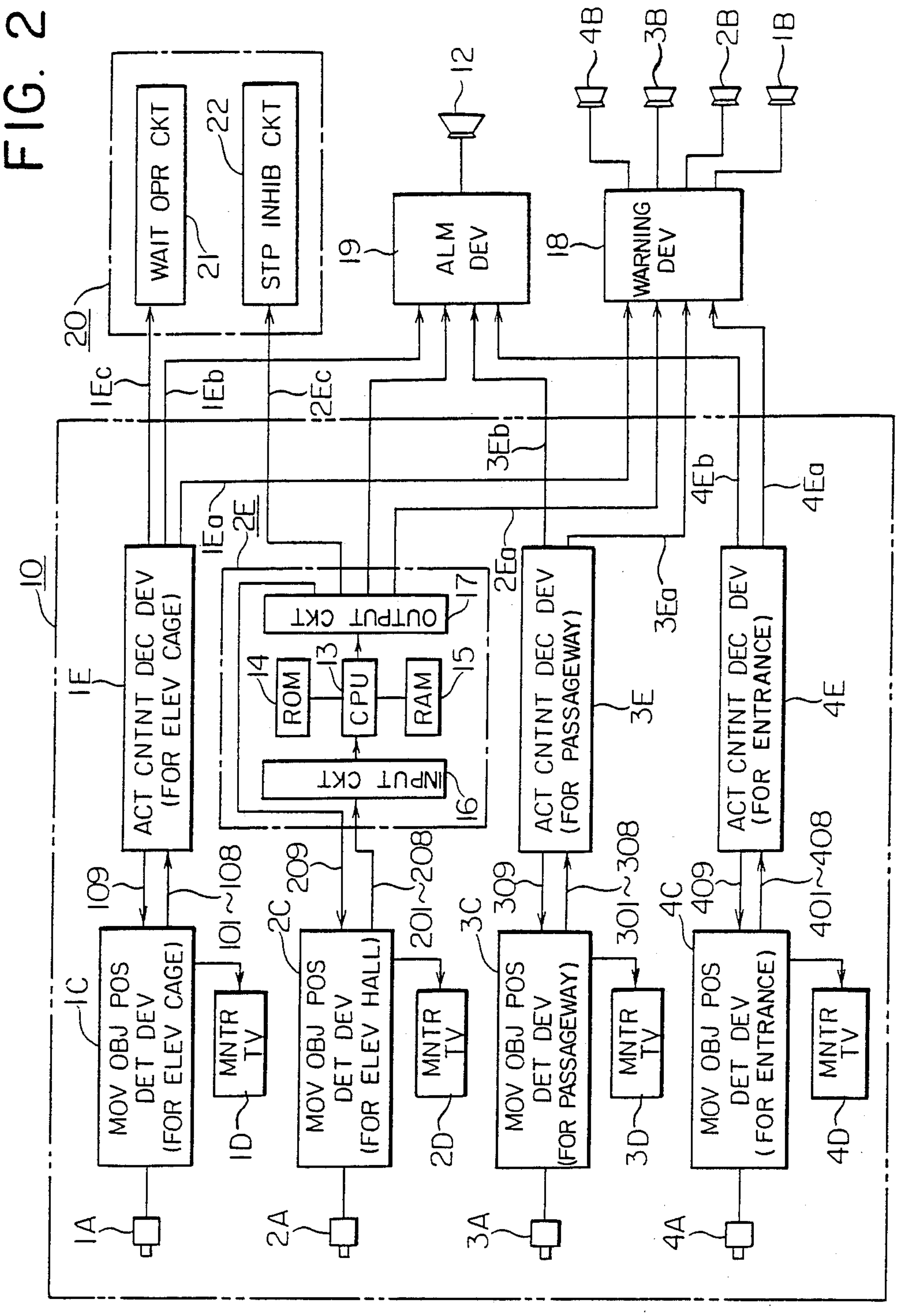
FIG. 2 is a system arrangement diagram of the monitor control apparatus.

FIG. 2 is a system arrangement diagram of the monitor control apparatus. In the figure, symbols 1C–4C denote well-known moving object position detection devices which analyze in a short period (for example, 30 cycles per second) the images picked up by the respective television cameras 1A–4A; automatically track the movements of corresponding persons in the cage 1, the elevator hall 2 of the first floor, the passageway 3 of the first floor, and the passageway 4 of the entrance one at a time; and deliver information items expressive of the respective tracking situations (X- and Y-coordinates of positions, areas, statuses, etc.) as tracking signals 101–108, 201–208, 301–308 and 401–408 for individual channels. In this embodiment, each detection device is provided with eight channels and can track up to eight persons separately. Monitor television sets 1D–4D disposed in the caretaker's room are respectively connected to the moving object position detection devices 1C–4C so as to display pictures and tracking situations based on the television cameras 1A–4A.

Figure 3:
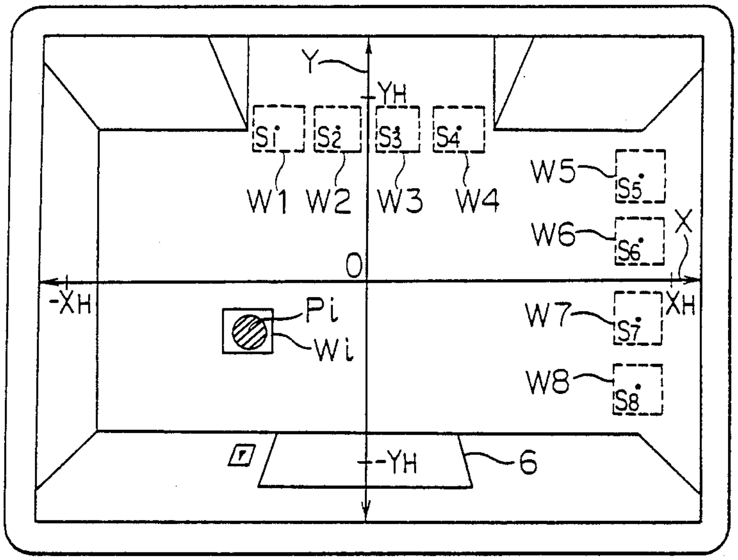
FIG. 3 is an explanatory view showing an example of the picture of a monitor television.

Here, an example of the picture of the monitor television set 2D owing to the television camera 2A mounted on the ceiling of the elevator hall 2 is shown in FIG. 3. Referring to the figure, the X-axis and Y-axis of the moving object position detection device 2C for the elevator hall 2 are previously adjusted so that the focus may be on the center of the elevator hall 2. On the X- and Y-axes, the elevator hall 2 is expressed by a range of $-X_H \leqq \times \leqq X_H$ and $-Y_H \leqq hy \leqq Y_H$. $S_1$–$S_8$ indicate measurement starting points which express initial positions for starting the tracking. Numeral 6 indicates the hall door of the elevator. In this embodiment, the darkest spot (corresponding to the head of a person) of the image picked up by the television camera 2A is detected. The position of the center of gravity of the spot is defined as a position $P_i$ ($i=1-8$), around which a window $W_i$ ($i=1-8$) of proper size (for example, such an extent of size that, when the size of a person viewed from above the head through the television camera 2A is considered, the person does not overlap another) is set. By setting the window $W_i$ ($i=1-8$), even when there are a large number of other dark spots (other persons), the movement of the predetermined person can be tracked without being affected by the spots. The other moving object position detection devices 1C, 3C and 4C are similar to the above. The moving object position detection devices 1C–4C are respectively supplied with control signals 109, 209, 309 and 409 from action content decision devices 1E, 2E, 3E and 4E, respectively, to be described later. The control signals 109, 209, 309 and 409 can be used for controlling the screen display of the monitor television sets 1D–4D, the erasing of the window $W_i$ ($i=1-8$) and the setting thereof to any desired coordinates, the initiation and termination of the tracking, the delivery of information items on any desired window (such as positional data, dark spots within the window, area and status), etc.

In FIG. 2, symbols 1E–4E denote the aforementioned action content decision devices made up of microcomputers. The action content decision device 2E for the elevator hall 2 is diagrammatically illustrated and includes a CPU 13, a ROM 14, a RAM 15, an input circuit 16 and an output circuit 17. The other action content decision devices 1E, 3E and 4E are similarly constructed. Symbols **1E*a*–4E*a* denote warning command signals which become "H" (a high level) when commands are given so as to issue a warning to people in the cage 1, the elevator hall 2, the passageway 3, and the road 4 of the entrance, respectively. Alarm command signals 1E*b*–4E*b* become "H" when commands are given so as to issue an alarm to the caretaker. A wait command signal 1E*c* becomes "H" when a command is given so as to make the cage 1 wait at a specified floor (in this embodiment, the first floor). A stop inhibition command signal 2E*c* becomes "H" when a command is given so as to prevent the cage 1 from stopping at a specified floor (in this embodiment, the first floor where the television camera 2A** is disposed).

Numeral 18 designates a well-known warning device which is disposed in the caretaker's room, and which selects a content conforming to any of the warning command signals **1E*a*–4E*a* and broadcasts it through the corresponding one of the loudspeakers 1B–4B. Numeral 19 designates a well-known alarm device, which selects a content conforming to any of the alarm command signals 1E***b*–4E*b* and broadcasts it through the loudspeaker 12. The elevator control device 20 is well known, and it has a well-known wait operation circuit 21 which, upon receiving the wait command signal 1E*c* as "H", causes the cage 1 to run to the first floor and to wait with its door open, and a well-known stop inhibition circuit 22 which, upon receiving the stop inhibition command signal 2E*c* as "H", nullifies the registrations of hall and cage calls for the first floor so as to inhibit the cage 1 from stopping at the first floor.

Next, the operation of the monitor control apparatus will be described in accordance with a flow chart shown in FIG. 4. Operations based on this flow chart are stored as a calculation program in the ROM 14 of the action content decision device 2E for the elevator hall.

Figure 4:
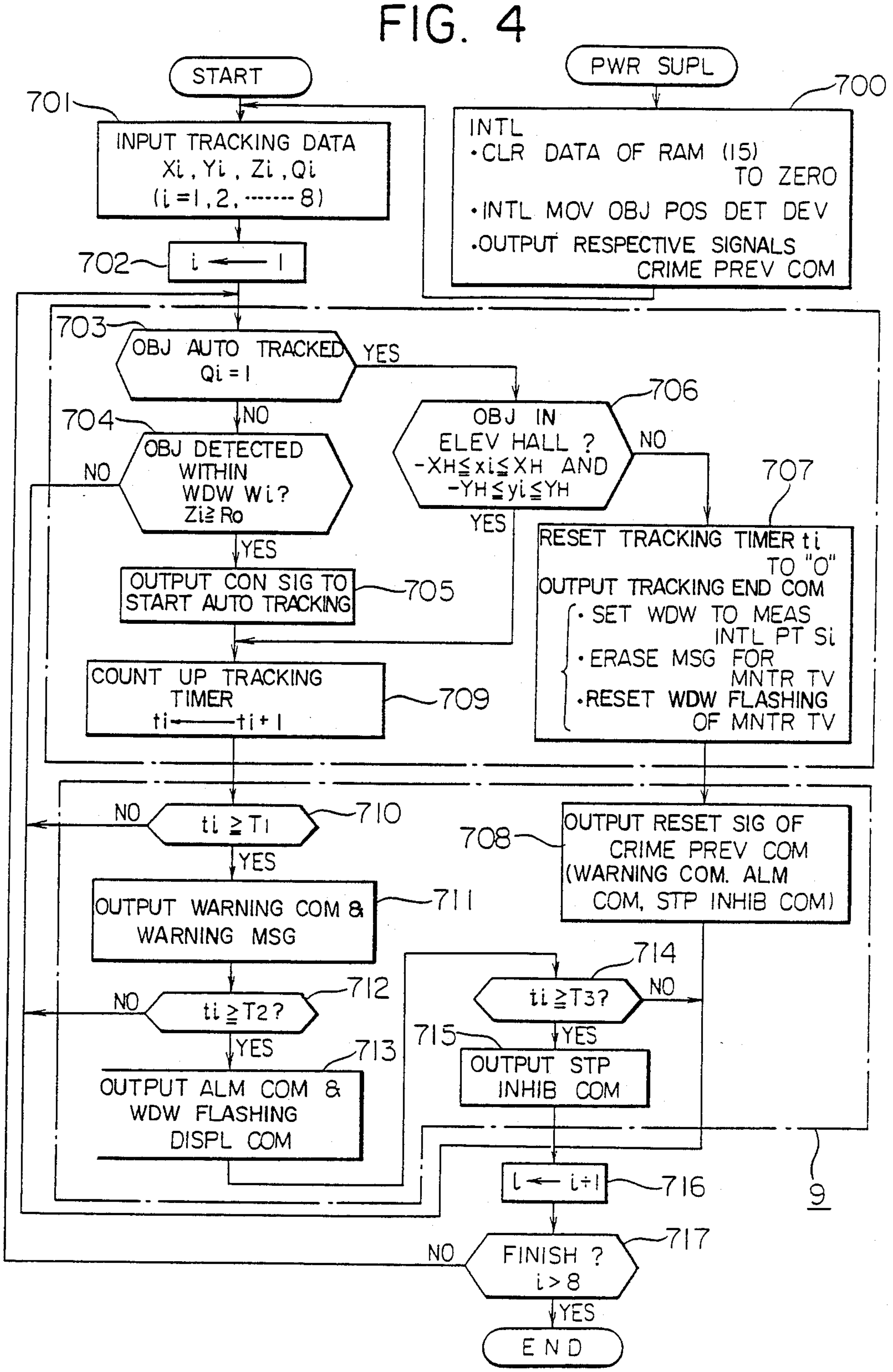
FIG. 4 is a flow chart showing the operation of the monitor control apparatus.

In the calculation program of FIG. 4, when the power supply has been connected, the apparatus is initialized at a step 700. At this initializing step 700, the control signal 209 is output for initialization such as setting data in the RAM 15 to a predetermined value, e.g., "0", causing the moving object position detection device 2C to set the respective windows $W_i$ to predetermined coordinates corresponding to the measurement initiation points $S_i$, setting the output modes of the tracking signals 201–208, and initializing the screen of the monitor television set 2D. In addition, the respective crime prevention command signals 2E*a*, 2E*b* and 2E*c* are output as "L" (a low level) to the warning device 18, the alarm device 19 and the stop inhibition circuit 22 which are crime prevention control devices. When the initializing step 700 has ended, steps 701–717 are repeatedly executed cyclically (in this embodiment, every 0.1 second).

First, at the step 701, the tracking signals 201–208 are input from the moving object position detection device 2C for the elevator hall through the input circuit 16, to set the positional coordinate data $x_i$ and $y_i$, area data (expressive of the area of a dark spot in the window $W_i$) $Z_i$ and status data (such as 'under tracking' data $0_i$) of each of the windows $W_i$ $(i=1-8)$ in the RAM 15. At the subsequent step 702, variable data i corresponding to each window $W_i$ (to be set in the RAM 15) is initialized to "1". Thenceforth, the steps 703–717 are repeated for all the windows $W_1$–$W_8$.

The step 703 decides whether or not an object within the window $W_i$ is being automatically tracked. Unless an object is being automatically tracked, the 'under tracking' data $Q_1$ is "0", and hence, the control flow proceeds to the step 704.

The step 704 decides whether or not an object (=a person) has been detected within the window $W_i$. If there is a person within the window $W_i$, the area data $Z_i$ becomes, at least, equal to a fixed value $R_0$ (preset in the ROM 14). The control flow therefore proceeds to the step 705, at which the control signal 209 is output through the output circuit 17 so as to start the automatic tracking for the window $W_i$. At the step 709, a tracking timer $t_i$ expressive of a period of time elapsed since the start of the tracking (to be set in the RAM 15) is counted up by "1". Unless there is a person within the window $W_i$, the area data $Z_i$ is "0". The control flow therefore proceeds to the step 716, at which the variable data i is counted up by "1" in order to execute processing for the next window $W_{i+1}$. Since it has begun to track a person within the window $W_i$, the 'under tracking' data $Q_1$ becomes "1" at the step 703. The control flow therefore proceeds to the step 706, which decides whether or not the automatic tracking is ended. When the person being tracked has disappeared from the elevator hall 2 by getting in the cage 1 or getting out of the elevator hall 2 by way of example, the positional coordinate becomes $x_i < -X_H$ or $x_i > X_H$, or $y_i < -Y_H$ or $y_i > Y_H$. At the step 707, therefore, the control signal 209 is output through the output circuit 17 so as to initialize the tracking timer $t_i$ to "0", to set the window $W_i$ to the measurement initiation point $S_i$, and to erase a message (to be described later) displayed on the screen of the monitor television set 2D, as well as the flashing display (to be described later) of the window.

While the person being tracked is within the elevator hall 2, the tracking timer $t_i$ is counted up by "1" in succession at the step 709, whereby the period of time elapsed since the start of the tracking is calculated. The steps 710–715 decide the degree of the strange behavior of the person being tracked, stepwise in accordance with the length of the elapsed time indicated by the tracking timer $t_i$ and function to perform crime preventive operations according to the decided steps. Prescribed periods of time $T_1$, $T_2$ and $T_3$ are fixed value data previously set in the ROM 14, and are respectively set to 1200 (=2 minutes), 3000 (=5 minutes) and 6000 (=10 minutes) in this embodiment. Accordingly, when the value of the tracking timer $t_i$ is smaller than the prescribed time $T_1$, the control flow proceeds along the steps 710→716, and any of the crime preventive operations is not performed. However, when the value of the tracking timer $t_i$ is $T_1 \leq t_i < T_2$, the control flow proceeds along the steps 710–711–712–716, and the warning command signal 2E*a* is rendered "H" and is output through the output circuit 17 at the step 711. The warning device 18 accordingly issues a warning gently with the information broadcast of, for example, "Please wait after depressing a hall button." through the loudspeaker 2B disposed on the ceiling of the elevator hall 2. The information broadcast is repeated periodically (for example, every 10 seconds) until the warning command signal 2E*a* is reset to "L". Simultaneously, at the step 711, the control signal 209 is output through the output circuit 17 so as to display the message to the effect that the warning has been issued (for example, "under warning"), on the screen of the monitor television set 2D disposed in the caretaker's room. If the person being tracked has gotten in the cage 1 or gotten out of the elevator hall 2 in conformity with the warning, the control flow proceeds along the steps 706→707→708, at which the warning command signal 2E*a* is reset to "L".

Next, when the value of the tracking timer $t_i$ has become $T_2 \leq t_i < T_3$, the control flow proceeds along the steps 710→711→712→713→714→716, the alarm command signal 2E*b* is rendered "H" and is output through the output circuit 17 at the step 713. Thus, the alarm device 19 issues an alarm to the caretaker by broadcasting "There is a suspiciously acting person in the elevator hall of the first floor." through the loudspeaker 12 disposed in the caretaker's room. Simultaneously, at the step 713, the control signal 209 is output through the output circuit 17 so that the part of the screen of the monitor television set 2D corresponding to the window $W_i$ may be flashingly displayed. Owing to the flashing display, the caretaker can acknowledge the position of the person of strange behavior in the elevator hall 2. The alarm to the caretaker is repeated periodically (for example, every 5 seconds) until the alarm command signal 2E*b* is reset to "L" at the step 708 because the person being tracked has disappeared from the elevator hall 2. The flashing display of the window on the screen of the monitor television set 2D is similarly continued until it is reset at the step 707.

Lastly, when the value of the tracking timer $t_i$ has become $t_i \geqq T_3$, the control flow proceeds along the steps 710→711→712→713→714→715→716, and the stop inhibition command signal 2E*c* is rendered "H" and is output through the output circuit 17 at the step 715. Thus, the stop inhibition circuit 22 in the elevator control device 20 prohibits the registrations of the hall call of the first floor and the cage call thereof. based on a destination button within the cage 1. Accordingly, the cage 1 does not stop at the first floor, whereby the person behaving strangely can be prevented from causing a crime in the cage.

In this way, the processes of the steps 703–716 are performed as to all the windows $W_1$–$W_8$. When the variable i becomes greater than 8 at the step 717, the processing in this calculation cycle is ended.

Since the calculation programs of the other action content decision devices 1E, 3E and 4E are organized substantially similarly to the calculation program of the action content decision device 2E for the elevator hall, they shall not be described in detail. Only the points of difference will be briefly explained. In the calculation program for the action content decision device 1E for the cage, the crime preventive command signals 1E*a*, 1E*b* and 1E*c* may be respectively output in lieu of the crime preventive command signals 2E*a*, 2E*b* and 2E*c* in FIG. 4, and the control signal 109 may be output in lieu of the control signal 209. Besides, at the step 706, whether or not the person being tracked has gotten out of the cage may be decided with the positional coordinate data $x_i$ and $y_i$. Particularly when the value of the tracking timer $t_i$ has become $t_i \geqq T_3$, the wait command signal $\mathbf{1E}_c$ is output as "H", and the cage 1 is run to the first floor and is kept waiting with its door open at the first floor, whereby the cage 1 is forbidden to run. Therefore, any crime in the cage by the person behaving strangely can be prevented from occurring.

Likewise, in the calculation programs of the action content decision devices 3E and 4E for the passageway and for the entrance, the crime preventive command signals 3E*a*, 3E*b* and 4E*a*, 4E*b* may be output in lieu of the crime preventive command signals 2E*a*, 2E*b* in FIG. 4, and the control signals 309 and 409 may be output in lieu of the control signal 209, respectively. Besides, at the steps 706, whether or not the person being tracked has gotten out of the predetermined region of the passageway 3 and whether or not he/she has gotten out of the predetermined region of the road 4 of the entrance may be decided with the positional coordinate data $x_i$ and $y_i$. Steps corresponding to the steps 714 and 715, and the output process of a crime preventive command signal corresponding to the stop inhibition command signal 2E*c* are not necessary.

As thus far described, in the embodiment, the actions of individual person within the predetermined regions of an elevator cage, an elevator hall, a passageway, and a road adjoining an entrance, which are places commonly used inside and outside a building, are tracked by means of moving object position detection devices which utilize the imaging of television cameras; the periods of time for which the persons are staying within the predetermined regions are calculated according to the tracking states; when the period of time has exceeded a prescribed time, the person being tracked is determined to be behaving strangely, i.e. is about to ambush someone or waiting for the chance to do so; and a warning is provided to the person behaving strangely or an alarm is provided to a caretaker; so that any crime can be prevented from occurring. In addition, since the caretaker need not always watch the monitor television, his/her burden can be lightened. Besides, the elevator cage is inhibited from stopping at a floor at which the person behaving strangely is, or the cage in which the person behaving strangely is riding is caused to stop with its door open and is forbidden from moving a specified floor, so that any crime in the elevator cage can be prevented from occurring.

Furthermore, in the embodiment, crime prevention control devices are operated stepwise in accordance with the lengths of the periods of time elapsed since the start of the tracking, so that an appropriate crime prevention conforming to the degree of a person's strange behavior can be effected.

In the embodiment, in detecting a person behaving strangely, the periods of time for which persons being tracked are staying within the predetermined regions commonly used are calculated, and when the period of time has become longer than a prescribed time interval, the respective person is determined to be behaving strangely. However, a feature for deciding that a person is behaving strangely is not restricted to the above. When investigating whether or not a person is behaving strangely, the following cases, may be considered:

(a) a case where the person is quietly watching for a chance in an unnoticeable place (for example, the corner of an elevator hall, the end of a passageway or a road, or the opposite side of a covert such as flowerpot), (b) a case where the person is watching for a chance while changing his/her place little by little, and (c) a case where the person is wandering about while waiting for a chance.

In view of such trends of actions by the persons behaving strangely, these persons can be detected by utilizing, for example, the following features of actions besides the feature in the foregoing embodiment:

(1) The period of time for which the person stays in a designated area as mentioned in the above item (a) is long.

(2) The period of time for which the person is standing still is long. (3) The period of time for which the person is walking is long.

(4) The number of times by which the person halts and begins to walk again is large.

(5) The number of times by which the person moves between designated areas is large.

(6) The distance by which the person has walked is long.

Figure 5:
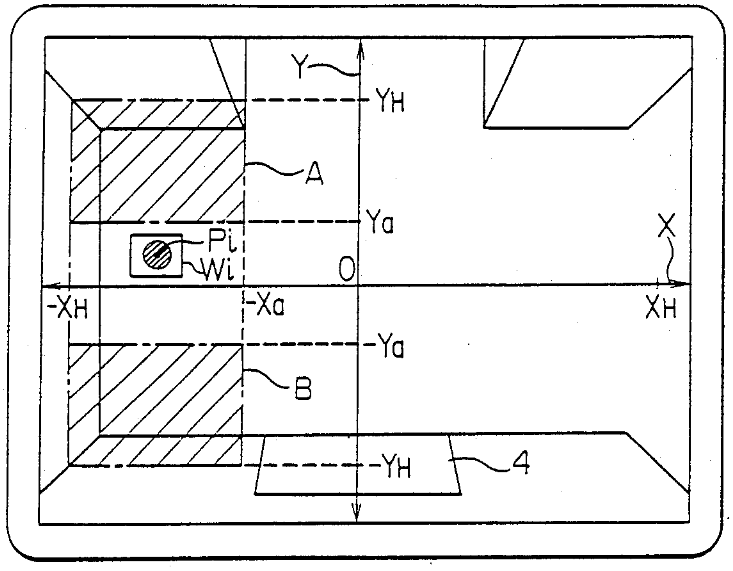
FIG. 5 is an explanatory view showing an example of the picture of the monitor television according to another embodiment.
Figure 6:
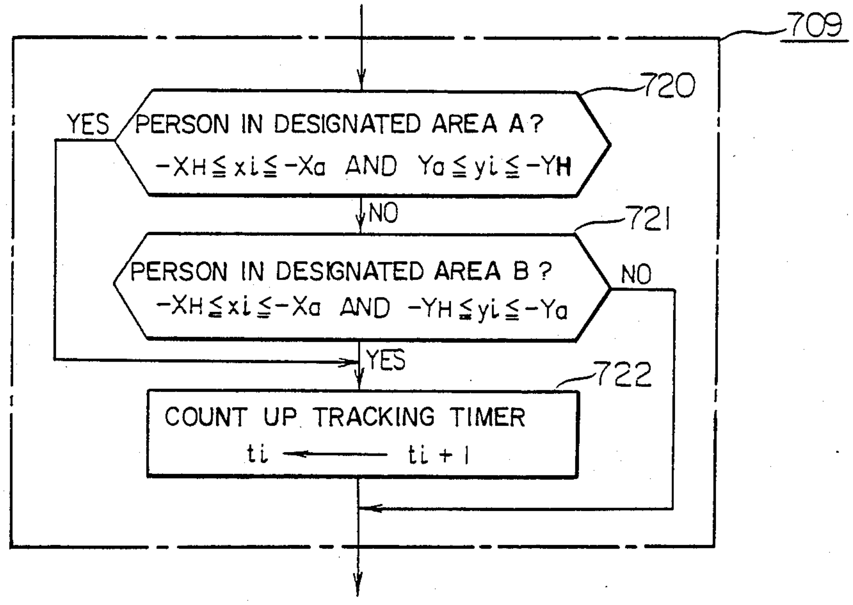
FIGS. 6 to 10 are flow charts showing modified embodiments of the operation of analysis means.

FIGS. 5 and 6 show another embodiment of this invention, which detects that a person is behaving strangely on the basis of the aforementioned feature (1) of the action.

FIG. 5 illustrates the picture of the elevator hall 2 of the first floor picked up by the monitor television set 2D. Hatched parts A and B in the figure are designated areas representing unnoticeable places in the elevator hall, and are respectively expressed by $-X_H \leqq x_i \leqq -X_a$, $Y_a \leqq y_i \leqq Y_H$ and $-X_H \leqq x_i \leqq -X_a$, $-Y_H \leqq y_i \leqq -Y_a$. FIG. 6 indicates steps corresponding to the step 709 performed by the analyzing unit 8 in the calculation program (FIG. 4) of the first embodiment. In this embodiment, when a person within the elevator hall 2 is being tracked, if the person being tracked is in the specified place A is decided at a step 720, and if he/she is in the specified place B is decided at a step 721. If, as a result, he/she is in the specified place A or B, the tracking timer $t_i$ is counted up by '1' at a step 722.

In this way, the period of time $t_i$ for which the person is staying in the specified place is calculated in this embodiment.

Figure 7:
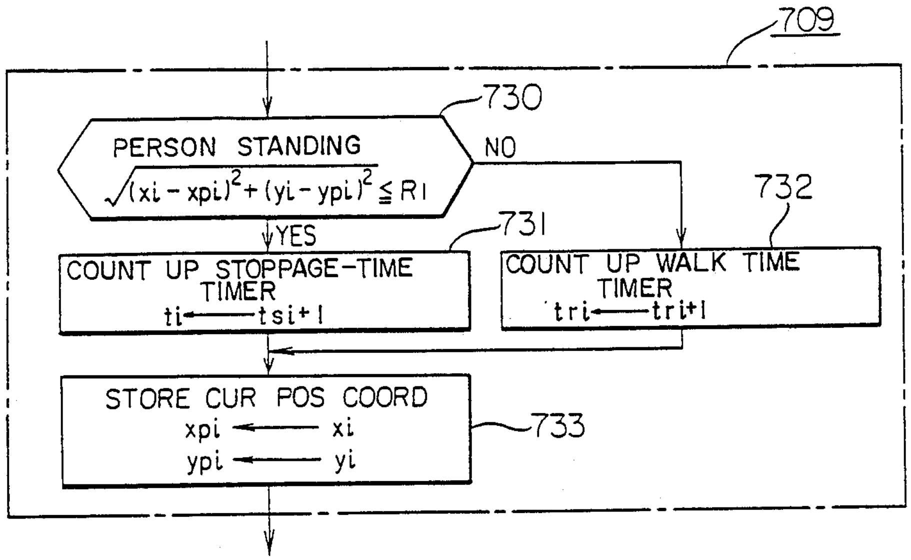

FIG. 7 similarly shows another embodiment of this invention, which detects that a person is behaving strangely on the basis of the aforementioned feature (2) or (3) of the action. FIG. 7 indicates steps corresponding to the step 709 performed by the analyzing unit 8 in the calculation program (FIG. 4) of the first embodiment. In the figure, $xp_i$ and $yp_i$ correspond to the positional coordinates $x_i$ and $y_i$ in the preceding calculation cycle and are set in the RAM 15. In addition, $ts_i$ and $tr_i$ denote a stoppage-time timer and a walk-time timer expressive of the cumulative values (in 0.1 second unit) of the time interval for which the person is at stop and the time interval for which he/she is walking, respectively, and they are also set in the RAM 15. Further, $R_1$ denotes fixed value data expressive of a speed stored in the ROM 14, and it is used for identifying whether the person being tracked is standing still or is walking. The stoppage-time timer $ts_i$ and the walk-time timer $tr_i$ are reset to '0' at the steps 700 and 707 in FIG. 4, and the preceding positional coordinates $xp_i$ and $yp_i$ are also initialized to the coordinates of the measurement initiation point $S_i$ at the steps 700 and 707.

$\sqrt{(x_i-xp_i)^2+(y_i-yp_i)^2}$ at a step 730 expresses a movement distance per unit time (0.1 second), in other words, a movement speed. If this movement speed is not greater than a fixed value $R_1$, it is decided that the person is standing still, and the stoppage-time timer $ts_i$ is counted up by '1' at a step 731. On the other hand, if the movement speed is greater than the fixed value $R_1$, it is decided that the person is walking, and the walk-time timer $tr_i$ is counted up by '1' at a step 732. At a step 733, the current positional coordinates $x_i$ and $y_i$ are stored as $xp_i$ and $yp_i$ for calculations in the next calculation cycle.

In this way, the stop time interval $ts_i$ and the walk time interval $tr_i$ are calculated in this embodiment.

Figure 8:
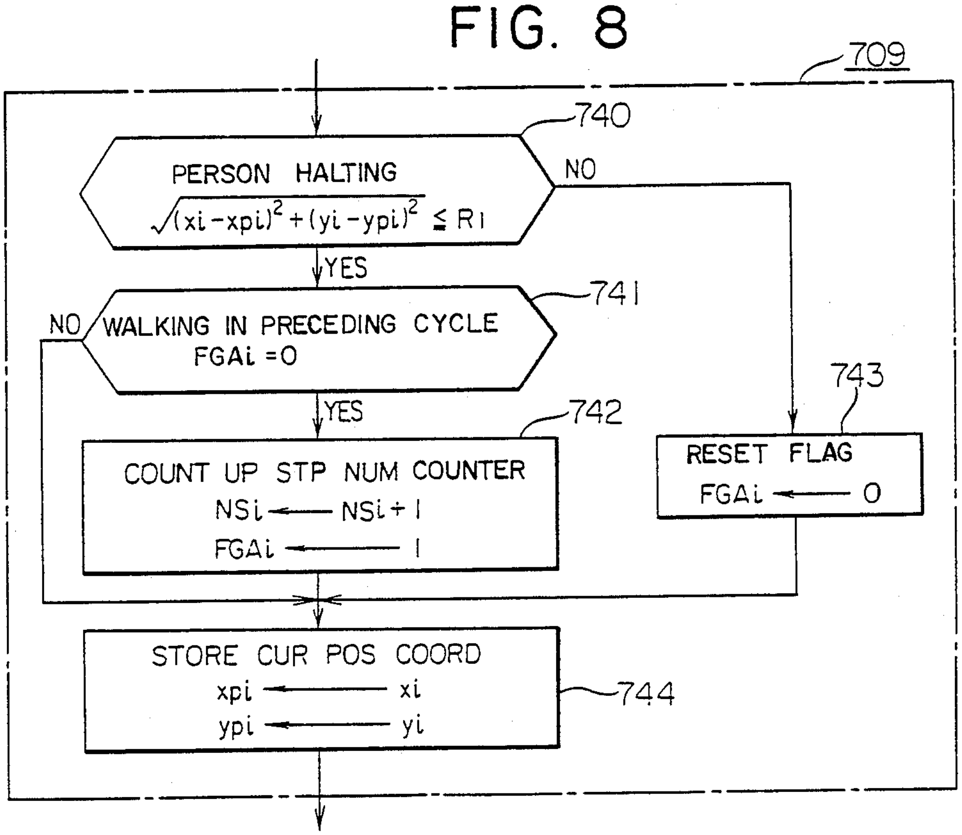

FIG. 8 also shows another embodiment of this invention, which detects that a person is behaving strangely on the basis of the aforementioned feature (4) of the action. FIG. 8 indicates steps corresponding to the step 709 of the analysis means 8 in the calculation program (FIG. 4) of the first embodiment. In the figure, $NS_i$ denotes a stoppage number counter expressive of the number of times a person has changed from a walk state to a halt state, and which is set in the RAM 15. In addition, $FGA_i$ denotes a flag which becomes '1' when the person being tracked is standing still in the preceding calculation cycle and becomes '0' when he/she is walking, and which is also set in the RAM 15. The stoppage number counter $NS_i$ and the flag $FGA_i$ are reset to '0' at the steps 700 and 707 in FIG. 4, and the preceding positional coordinates $xp_i$ and $yp_i$ are also initialized to the coordinates of the measurement initiation point $S_i$ at the steps 700 and 707.

A movement speed $\sqrt{(x_i-xp_i)^2+(y_i-yp_i)^2}$ is compared with a fixed value $R_1$ at a step 740. When it is decided that the person being tracked is walking, the flag $FGA_i$ is reset to '0' at a step 743. If the halt state is decided at the step 740 and the walk state was decided in the preceding cycle at step 741, the stoppage number counter $NS_i$ is counted up by '1' and the flag $FGA_i$ is set to '1' at a step 742. Unless the walk state in the preceding cycle is decided at the step 741, the stoppage number $NS_i$ is not counted up. At a step 744, the preceding positional coordinates $xp_i$ and $up_i$ are updated as in the third embodiment. In this way, the number of times $NS_i$ by which the person halted is calculated in this embodiment.

Figure 9:
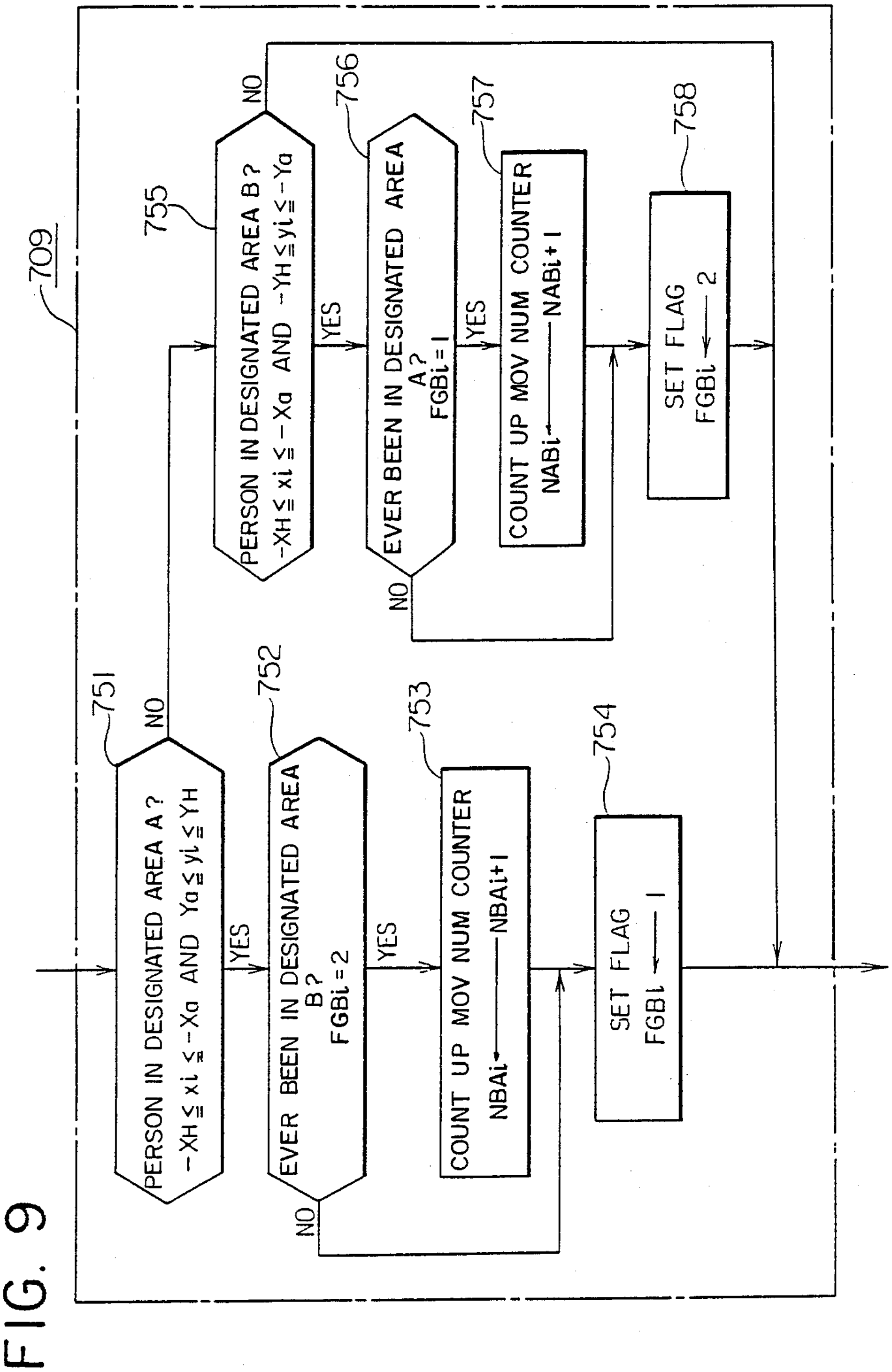

FIG. 9 shows another embodiment of this invention, which detects that a person is behaving strangely on the basis of the aforementioned feature (5). FIG. 9 indicates steps corresponding to the step 709 of the analysis means 8 in the calculation program (FIG. 4) of the first embodiment. In the figure, $NBA_i$ denotes a movement number counter expressive of the number of times by which the person has moved from the designated area B to the designated area A in FIG. 5, and $NAB_i$ similarly denotes a movement number counter expressive of the number of times by which the person has moved from the designated area A to the designated area B. $FGB_i$ denotes a flag which becomes '1' when the person being tracked has previously been in the designated area A, becomes '2' when he/she has previously been in the designated area B and becomes '0' at any other time, and which is set in the RAM 15. The movement number counters $NBA_i$, $NAB_i$ and the flag $FGB_i$ are respectively reset to '0' at the step 700 and the step 707 in FIG. 4.

If it is decided at a step 751 that a person being tracked is in the designated area A, and it is decided at a step 752 that the person being tracked has previously been in the designated area B ($FGB_i$='2'), then the movement number counter $NBA_i$ is counted up by '1' at a step 753, and the flag $FGB_i$ is set to '1' at a step 754. If the person has never been in the designated area B ($FGB_i$='0' or '1'), the movement number counter $NBA_i$ is not counted up, and merely the flag $FGB_i$ is set to '1' at the step 754.

If the person being tracked is in the specified place B, the control flow proceeds along steps 751→755→756. If at the step 755, it is decided that the person has previously been in the designated area A ($FGB_i$='1'), the movement number counter $NAB_i$ is counted up by '1' this time at a step 757, and the flag $FGB_i$ is set to '2' at a step 758. If the person has never been in the designated area A ($FGB_i$='0' or '2'), the movement number counter $NAB_i$ is not counted up, and merely the flag $FGB_i$ is set to '2' at the step 758. If the person is in neither of the designated areas A and B, none of the movement number counters $NAB_i$, $NBA_i$ and the flag $FGB_i$ is updated.

In this way, the numbers of times $NBA_i$ and $NAB_i$ of the movements between the two designated areas are calculated in this embodiment. It is needless to say that the numbers of times of movements among three or more designated areas can be calculated in accordance with the same concept.

Figure 10:
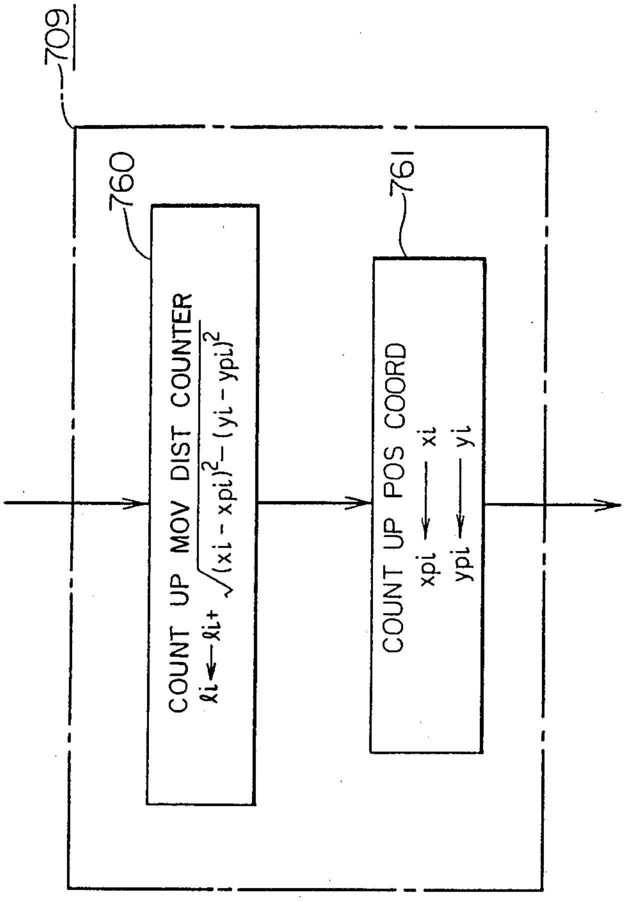

FIG. 10 also shows another embodiment of this invention, which detects that a person is behaving strangely on the basis of the aforementioned feature (6) of the action. FIG. 10 indicates steps corresponding to the step 709 performed by the analyzing unit 8 in the calculation program (FIG. 4) of the first embodiment. In the figure, $l_i$ denotes a movement distance counter expressive of a distance by which a person being tracked has moved about, and this counter is set in the RAM 15. The movement distance counter $l_i$ is reset to '0' at steps 700 and 707 in FIG. 4, and the preceding positional coordinates $xp_i$ and $yp_i$ are also initialized to the coordinates of the measurement initiation points $S_i$ at the steps 700 and 707.

At a step 760, a distance $\sqrt{(x_i-xp_i)^2+(y_i-yp_i)^2}$ by which a person has moved from his/her preceding position is added to his/her movement distance $l_i$ till the preceding cycle, thereby to update the movement distance $l_i$. At a step 761, the preceding positional coordinates $xp_i$ and $yp_i$ are updated for calculations in the next calculation cycle. In this way, the distance $l_i$ by which the person has moved is calculated in this embodiment.

The values of the feature data calculated by the analysis means 8 as thus far described in the second–sixth embodiments, namely, the total staying time interval $t_i$ in a designated area, the halting time interval $ts_i$ as well as the walking time interval $tr_i$, the number of times of stoppage $NS_i$, the numbers of times $NAB_i$ and $NBA_i$ of the movements between designated areas, and the movement distance $l_i$ are substituted for the staying time interval $t_i$ in the decision means 9 (FIG. 4) of the first embodiment and are compared with prescribed values $T_1$, $T_2$ and $T_3$ (for which appropriate values are previously set in accordance with the sorts of the feature data), and the crime preventive operations are performed in accordance with the compared results, whereby effects similar to those of the first embodiment can be attained.

It is also considered that the way of movements, namely, the order of movements between two or more designated areas is set as feature data, and it is also possible that the loci of received positional coordinates $x_i$ and $y_i$ are directly stored in the RAM 15 so as to be used as feature data. The feature data may be compared with standard movement orders or loci set in the ROM 14 beforehand, and whether or not a person is a suspiciously acting one may be decided from the degrees of similarity between them so as to perform the crime preventive operations.

Furthermore, it is to be understood that such feature data sorts can be properly combined for decision, whereby the decision of the suspiciously acting person can be rendered at a still higher precision.

Still further, in case of monitoring the actions of persons within an elevator hall or a cage, the motions of the cage of an elevator (such as cage position, running direction and open or closed door state), the situation of registration of hall calls as well as cage calls, the situation of manipulation of manipulatory appliances within the hall or the cage (such as hall button, destination button, door opening button and door closing button) by the person being tracked, and so forth can be considered in combination with the above feature data, whereby the decision of the suspiciously acting person can be rendered still more accurately.

As the prescribed values $T_1$, $T_2$, $T_3$, the fixed data $X_H$, $Y_H$, $X_a$, $Y_a$ for prescribing the regions, and the fixed data $R_1$ etc. for use in calculating the feature data, the motions of a person may be, for example, actually measured so as to set them to values suitable for the corresponding monitoring place on the basis of the actually measured results. It is also easy to dispose variable switches and to permit the set values to be properly altered. In addition, it is possible to automatically and actually measure the motions of a person by the use of the measuring unit 7 as well as the analyzing unit 8 and to statistically process the actually measured results, thereby to automatically set the prescribed values $T_1$, $T_2$, $T_3$, the fixed data $X_a$, $Y_a$, $R_1$, etc. to appropriate values.

Moreover, when two or more windows track an identical moving object, the monitoring capability lowers. In order to solve this drawback, by way of example, a measure may be taken in which the correlation of tracking data afforded by windows under tracking is found, and when the correlation is very high, it is decided that the same object is being tracked, and all the windows except one are set in stand-by states. It is one method of decision that the positional data items $x_i$ and $y_i$ are compared for a predetermined period, whereupon when the summations of their differences are less than fixed values, the tracking of the same object is decided.

In each of the foregoing embodiments, the measurement initiation points $S_1$–$S_8$ in the elevator hall 2, for example, are set at random at the entrance and exit of the hall for the respective windows $W_1$–$W_8$ as shown in FIG. 3, but where and how to set the measurement initiation points are not restricted thereto. Windows may well be set at the doorway 6 of the cage so as to track the actions of persons getting off.

In case of the embodiments, when one window is under tracking, the domain of the measurment initiation point of the window becomes vacant, and a person having come therefrom into the elevator hall cannot be detected. In order to eliminate this drawback, there are considered various systems such as a system in which the size of the adjacent window standing by at the measurement initiation point thereof is temporarily expanded so as to cover the domain of the measurement initiation point of the tracking window, and a system in which one of the windows is made large enough to detect a person entering the elevator hall and is used exclusively for detecting and tracking the detected person and is delivered to another window.

In the embodiments, so long as an object being tracked does not exit of the elevator hall, the tracking is continued. Therefore, when an "article" such as flowerpot has been carried in, a window tracking it is, in effect, unusable for the detection of a suspiciously acting person on account of the tracking of the "article". In order to eliminate this drawback, by way of example, a measure may be taken in which the halting time interval of each stop is calculated substantially similarly to the calculation of the halting time interval $ts_i$ in the third embodiment, whereupon when the calculated halting time interval exceeds a sufficiently long time (for example, 5 minutes), the object being tracked is decided an "article" and the tracking thereof is ended. To the contrary, an "article" can also be decided from the fact that the walking time interval $tr_i$ within a fixed period is shorter than a predetermined value. Besides, the detection of an "article" makes it possible to detect a "suspicious article left".

Further, in the embodiments, a single place for common use is monitored with a single moving object position detection device (8 channels). However, for a place for common use which is too extensive to satisfactorily monitor with the single moving object position detection device (for example, a long passageway or a spacious hall), the region is dividedly monitored with a plurality of moving object position detection devices, and when an object being tracked has moved from one divided area to another, tracking information items (such as feature data) obtained till then are simultaneously transferred to the boundary of the divided areas, whereby continuous tracking and monitoring over a wide range can be realized. At this time, when the transfer of the tracking information is performed by simultaneously detecting the features of the object being tracked, such as shape and color, and checking them, the tracking information can be reliably transferred even in the presence of many objects to be tracked.

Although, in the embodiments, the moving object position detection device whose input signal is an image picked up by a television camera has been employed as a measurement device for tracking the movement of an object, the measurement device is not restricted thereto. By way of example, the movement of an object may well be tracked on the basis of an input signal provided by an infrared camera or an ultrasonic transducer. In addition, although a dark spot has been detected and tracked, a bright spot or a specified color or shape may well be detected and tracked. At this time, when the coloration of a floor, walls etc. or the way of illumination is contrived so as to clearly distinguish an object from the background thereof, the drawback of missing the object in the course of the tracking can be mitigated.

Although, in the embodiments, a warning device, an alarm device, and a stop inhibition circuit and a wait operation circuit for a cage have been employed as crime preventive control devices, the crime preventive control devices are not restricted thereto. By way of example, the crime preventive control devices may well be an each-floor stopping operation circuit and a nearest-floor stoppage circuit for the cage, and a picture recording device which records the picture of a monitor television set only when a warning or an alarm is being issued. In short, any number of devices effective for crime prevention may be used.

Besides, a crime preventive system of high reliability can be constructed by monitoring an object in combination with a sensor for preventing invasion.

further, places to be monitored are not restricted to those in the embodiments, but this invention is of course applicable even when monitoring, for example, places for common use such as elevator halls on all floors and all passageways within a building, and the whole surrounding area of the building.

As understood from the above description, this invention provides a monitor control apparatus in which the actions of individual persons in predetermined regions such as a hall, passageway, road and elevator cage being places for common use inside and outside a building are tracked, and the peculiar ways of the actions are analyzed, thereby to automatically detect that a person is behaving strangely and to actuate crime preventive control devices. Therefore, the invention has the effect that crimes can be reliably prevented from occurring.

What is claimed is:

1. In an elevator system including a plurality of cages for servicing a plurality of floors in a building, a monitor control apparatus determining movements of passengers within designated areas and executing predetermined functions in accordance therewith so as to prevent crimes from being committed within and in the vincinity of the cages, said monitor control apparatus comprising:

measurement means monitoring images of individual passengers on a time basis for tracking passenger movements within designated areas and for generating tracking signals representative thereof;

analyzing means responsive to the tracking signals for analyzing the monitored images and determining behavior representing time-based patterns of movements of the individual passengers and for generating a feature signal indicative thereof; and decision means responsive to the feature signal generated by said analyzing means to output a command signal for executing predetermined functions when the feature signal based on the monitored images satisfies a condition representing a given time-based behavior pattern of an individual passenger.

2. A monitor control apparatus according to claim 1 wherein said analyzing means calculates a number of times by which an individual passenger has moved between at least two designated areas not overlapping each other on the basis of the tracking signals and outputs a signal representing a number of times of movement between the designated areas as the feature signal.

3. A monitor control apparatus according to Claim 2 wherein said decision means outputs the command signal when the number of times of movement between designated areas represented by the feature signal exceeds a prescribed value.

4. A monitor control apparatus according to claim 1 wherein said analyzing means calculates a distance by which an individual passenger has moved on the basis of the tracking signals and outputs a signal representing a total movement distance obtained by cumulating such distances as the feature signal.

5. A monitor control apparatus according to Claim 4 wherein said decision means outputs the command signal when the total movement distance represented by the feature signal exceeds a prescribed value.

6. A monitor control apparatus according to Claim 1 wherein said decision means outputs the command signal for operating a crime preventive control device when that a value of the feature signal exceeds a prescribed value indicating a condition of strange behavior of a passenger.

7. A monitor control apparatus according to claim 6 wherein said decision means compares the value of the feature signal with at least two different prescribed values and outputs the command signal for operating different crime preventive control devices in accordance with the compared results.

8. In an elevator system including a plurality of cages for servicing a plurality of floors in a building, a monitor control apparatus for determining movements of passengers within designated areas and for executing predetermined functions in accordance therewith so as to prevent crimes from being committed within and in the vicinity of the cages, said monitor control apparatus comprising:

measurement means detecting images of the passengers for tracking passenger movements within the designated areas and for generating tracking signals representative thereof;

analyzing means responsive to the tracking signals for calculating a resident period of time during which a passenger remains within a designated area to determine behavior representing movements of the passenger and for generating a feature signal indicative of a total resident period of time obtained by cumulating the resident periods of time for the designated areas; and decision means responsive to the feature signal generated by said analyzing means to output a command signal for executing predetermined functions when the feature signal based on the detected images satisfies a condition representing a given behavior pattern of the tracked passengers.

9. A monitor control apparatus according to Claim 8 wherein said decision means outputs the command signal when the total resident periods of time represented by the feature signal exceeds a prescribed value.

10. In an elevator system including a plurality of cages for servicing a plurality of floors in a building, a monitor control apparatus for determining movements of passengers within designated areas and for executing predetermined functions in accordance therewith so as to prevent crimes from being committed within and in the vicinity of the cages, said monitor control apparatus comprising:

measurement means detecting images of the passengers for tracking passenger movements within the designated areas and for generating tracking signals representative thereof;

analyzing means responsive to the tracking signals for calculating a period of time during which a passenger moves within a designated area with a moving speed lower than a predetermined value to determine behavior representing movements of the passenger and for generating a feature signal indicative of a cumulative period of time obtained by cumulating such periods of time; and decision means responsive to the feature signal generated by said analyzing means to output a command signal for executing predetermined functions when the feature signal based on the detected images satisfies a condition representing a given behavior pattern of the tracked passengers.

11. A monitor control apparatus according to Claim 10 wherein said decision means outputs the command signal when the cumulative period of time represented by the feature signal exceeds a prescribed value.

12. In an elevator system including a plurality of cages for servicing a plurality of floors in a building, a monitor control apparatus for determining movements of passengers within designated areas and for executing predetermined functions in accordance therewith so as to prevent crimes from being committed within and in the vicinity of the cages, said monitor control apparatus comprising:

measurement means detecting images of the passengers for tracking passenger movements within the designated areas and for generating tracking signals representative thereof;

analyzing means responsive to the tracking signals for calculating a period of time during which a passenger moves within a designated area with a moving speed higher than a predetermined value to determine behavior representing movements of the passenger and for generating a feature signal indicative of a cumulative period of time; and decision means responsive to the feature signal generated by said analyzing means to output a command signal for executing predetermined functions when the feature signal based on the detected images satisfies a condition representing a given behavior pattern of the tracked passengers.

13. A monitor control apparatus according to Claim 12 wherein said decision means outputs the command signal when the cumulative period of time represented by the feature signal exceeds a prescribed value.

14. In an elevator system including a plurality of cages for servicing a plurality of floors in a building, a monitor control apparatus for determining movements of passengers within designated areas and for executing predetermined functions in accordance therewith so as to prevent crimes from being committed within and in the vicinity of the cages, said monitor control apparatus comprising measurement means detecting images of the passengers for tracking passenger movements within the designated areas and for generating tracking signals representative thereof;

analyzing means responsive to the tracking signals for calculating a number of times by which passenger movement has shifted from a speed lower than a predetermined value to a speed higher than a predetermined value, or vice versa, to determine behavior representing movements of the passenger and for generating a feature signal indicative of the number of times of speed shifting; and decision means responsive to the feature signal generated by said analyzing means to output a command signal for executing predetermined functions when the feature signal based on the detected images satisfies a condition representing a given behavior pattern of the tracked passengers.

15. A monitor control apparatus according to Claim 14 wherein said decision means outputs the command signal when the number of times of speed shifting represented by the feature signal exceeds a prescribed value.

* * * * *